C. F. BURGESS.
HAND LAMP.
APPLICATION FILED MAY 21, 1917.
1,297,655.
Patented Mar. 18, 1919.
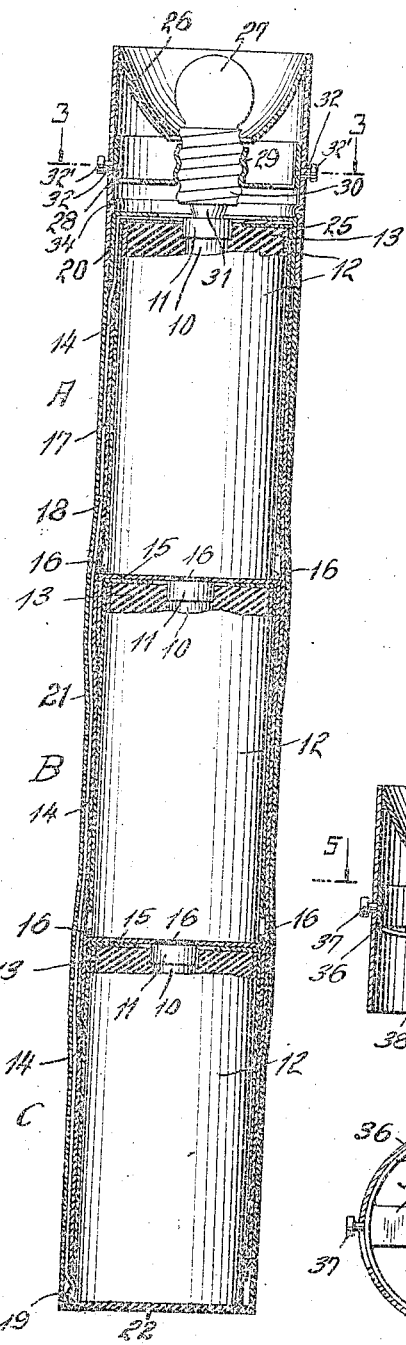
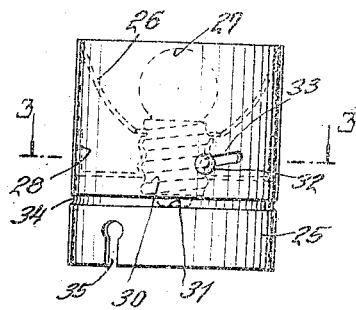
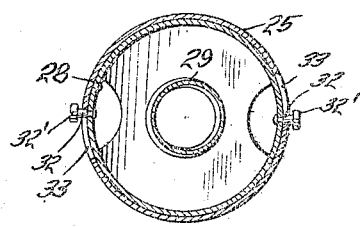
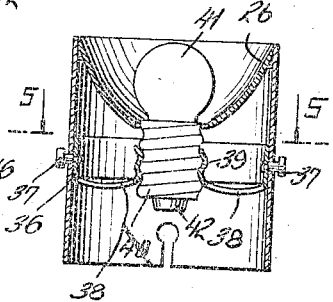
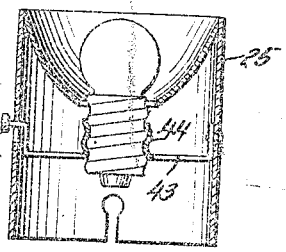
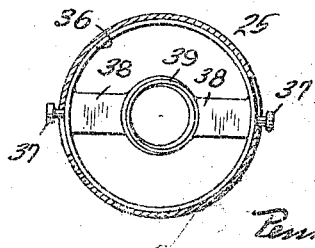
INVENTOR
Charles F. Burgess
BY
ATTORNEYS

UNITED STATES PATENT OFFICE.

CHARLES F. BURGESS, OF MADISON, WISCONSIN, ASSIGNOR TO BURGESS BATTERY COMPANY, A CORPORATION OF WISCONSIN.

HAND-LAMP.

1,297,655.   Specification of Letters Patent.   Patented Mar. 18, 1919.

Application filed May 21, 1917. Serial No. 169,870.

*To all whom it may concern:*

Be it known that I, CHARLES F. BURGESS, a citizen of the United States, residing at Madison, in the county of Dane, State of Wisconsin, have invented certain new and useful Improvements in Hand-Lamps; and I do hereby declare the following to be a full, clear, and exact description of the invention, such as will enable others skilled in the art to which it appertains to make and use the same.

The present invention relates to battery hand lamps of a type in which the battery is composed of a plurality of dry cells permanently connected together to form a unitary, rigid structure, which is serviceable as the body or handle of the device, and to one end of which a lamp may be detachably connected. In hand lamps of the present invention, the battery or body portion may be discarded when the cells of the battery become exhausted and a new battery substituted. The initial cost of the complete equipment is low, and as compared with many hand lamps now in use, there is a very considerable reduction in weight through elimination of the heavy fiber or metal casing in which the batteries of such devices are housed.

It is an object of the present invention to provide a lamp support which may be attached conveniently to the end of the battery and in which the lamp itself is movably mounted so that it may be brought into or out of contact with a terminal of the battery to light or extinguish it. To accomplish this result in most effective manner, the battery may be of special construction as described herein. Other features and advantages of the invention will appear from a description of certain preferred embodiments thereof as illustrated in the accompanying drawings, in which—

Figure 1 is a view, principally in section, showing the arrangement of the cells composing the battery with one embodiment of the lamp support of the present invention applied to the end thereof.

Fig. 2 is an elevation of the lamp holder of Fig. 1.

Fig. 3 is a section along the line 3—3 of Fig. 2.

Fig. 4 is a sectional elevation of a modified form of lamp support.

Fig. 5 is a section along the line 5—5 of Fig. 4.

Fig. 6 is a sectional elevation of another form of lamp support.

Referring to the drawings, in which similar reference characters denote similar parts throughout the several views, the battery shown in Fig. 1 is composed of three dry cells A, B and C. Each of the cells has a carbon electrode 10 tipped with a metallic cap 11 which forms one terminal thereof. The other electrode of each cell is in the form of a zinc cup 12 which also serves as a container for the electrolytic paste and the depolarizing material which constitute parts of each cell. The paste and material are retained within the cell by the pitch seal 13. The foregoing details may be varied in many ways. A wrapping of impregnated paper or other suitable material 14, preferably waterproofed, surrounds the zinc cup except for a small portion near the bottom thereof. This wrapping is turned over the top of the cell and extends inwardly toward the metallic cap 11. Each of the cells of the battery, except the first one A, has fitted tightly upon its upper end a metallic cap 15 which extends inwardly far enough to engage the upper face of terminal 11 to which it preferably is soldered. When the cells are placed together as shown in Fig. 1, the zinc cup of one cell rests upon the cap 15 of an adjacent cell, but in order to make a better electrical contact and to attach the cells rigidly together, solder may be applied at a number of places as indicated at 16. The entire number of cells thus rigidly connected together in series connection and constituting the battery are wrapped with a covering 17 of paper or other suitable insulating material. The paper may be waterproofed. A conducting strip 18 is attached at its lower end 19, to the exposed zinc cup of the third cell C. The conducting strip extends to the other end of the battery where it is firmly held beneath and makes electrical connection with a terminal cap 20 forced tightly over the outer end of the cell A and provided with an aperture through which access may be obtained to the terminal 11. To protect the conducting strip 18, the entire battery, except for the cap 20, is covered with a wrapping 21 of paper, cloth or other suitable material, and if desired this wrapping may be waterproofed before or after its application, as with China wood oil, or with paraffin or the like. The bottom of the battery may be covered by a disk or cap 22 also of insulating material, or the side wrapping may be folded in over the bottom of the lowermost cell.

With the construction above described, the two terminals of the battery are adjacent to one another in convenient relation for ready attachment to a current-consuming device. In the device shown in Fig. 1 there is a metallic sleeve or casing 25 of a size to fit over the cap which constitutes the outer terminal of the battery. Attached to the outer end of this sleeve and extending within it is a metallic reflector 26 provided with an aperture at its inner end, through which the incandescent lamp 27 is adapted to be moved. This lamp is mounted on a sliding member 28 which is provided with a screw-threaded socket portion 29 adapted to receive the base 30 of the lamp. The inner terminal 31 of the lamp is adapted to engage the metallic cap 11 constituting the inner terminal of the battery. The support 28 is retained in place within the sleeve 25 by means of studs 32 which pass through inclined slots 33 cut in diametrically opposite points of the sleeve. The studs 32 are provided on their outer ends with buttons 33 by which they may be more conveniently manipulated. The relation of the inclined slots to the casing is such that when the latter is in place upon the end of the battery, as shown in Fig. 1, partial rotation of the lamp support by means of the buttons 33 will cause the lamp to be pushed into contact with or withdrawn from the terminal 11 of the battery to make or break the circuit of the lamp. In order to insure that the sleeve 25 is placed upon the end of the battery the right distance, a swage 34 is formed in the casing 25 at such a point that it will act as a stop against the end of the battery. That portion of the sleeve 25 which fits over the end of the battery should preferably be provided with slots 35 in order to cause a spring fit of the sleeve to securely retain it in place upon the battery.

In the device described above, the lamp is rigidly mounted in the supporting member 28 and its inner terminal is brought into contact with the inner terminal of the battery solely by the cam action of the inclined slots and coöperating studs. It may, however, in some cases be desirable to provide a resilient support for the lamp and such an arrangement is illustrated in Figs. 4 and 5, in which the sleeve 25 carries the reflector 26 and a supporting member 36 in the form of a ring retained in place within the casing by studs 37 passing through inclined slots in the walls thereof. Extending inwardly from the ring 36 are spring arms 38 of which two are shown in Fig. 5, although any desired number may be used. These spring arms support a lamp socket 39 adapted to receive the base 40 of the lamp 41, the inner terminal 42 of which is adapted to engage the inner terminal 11 of the battery precisely as in the construction shown in the other figures, but on account of the spring support the rotation of the ring 36 will cause the inner terminal of the lamp to be firmly pressed into contact with the corresponding terminal of the battery. The spring safeguards the lamp base against undue pressure.

The embodiments of the invention described depend upon a partial rotation of the lamp support to control the circuit of the lamp. In some cases, however, it is convenient to provide a support in which the lamp may be controlled by a motion of its carrier with respect to the casing but without rotary motion therein. Such an arrangement is illustrated in Fig. 6 in which the casing 25 has attached to one side thereof a resilient member 43 constituting a support for the lamp socket 44. The free end of this supporting member is bent upwardly and then extends outwardly through an aperture in the casing and carries at its outer end a button 45 by which the support may be manipulated. The resiliency of the support will tend to bring the lamp into the normal position shown in Fig. 6 and break its circuit as soon as the button 45 is released. While with the construction shown in this figure there is a motion of the lamp relative to the reflector it will not be sufficient to cause the filament of the lamp to move far enough from the focus of the reflector to have any considerable disadvantageous effect upon the beam of light emitted from the surface of the reflector.

In all of the arrangements described herein the lamp is movable through an aperture in the bottom of the reflector, which, with the casing, remains in fixed relation to the end of the battery upon which it is placed. The motion of the lamp to carry its inner terminal into or out of contact with the inner terminal of the battery will be of such a limited extent that the shifting of the filament of the lamp with respect to the focal point of the concave reflector will not seriously interfere with the reflection of the rays of light as a substantially parallel beam from the surface of the reflector.

While certain embodiments of the invention have been illustrated and described it will be understood that the invention is not to be limited to these particular embodiments, as various other changes in the details of construction of the apparatus and arrangements for mounting the lamp socket are embraced within the principle of the invention.

I claim:—

1. In combination, a battery comprising a plurality of dry cells electrically connected in series and having a central terminal of one polarity and an adjacent terminal of opposite polarity, a metal casing contacting with said adjacent terminal, a lamp, and a support for said lamp electrically connected with said casing and adapted to move said lamp with respect to said casing into and out of engagement with said central terminal.

2. A battery hand lamp comprising, in combination, a battery having a central terminal of one polarity and an outer terminal of opposite polarity, a casing adapted to be detachably secured to said battery in electrical contact with said outer terminal, a lamp support movably mounted in said casing and means for moving said lamp support with respect to said casing to carry the lamp into or out of engagement with the central terminal of the battery.

3. A battery hand lamp comprising, in combination, a battery having a central terminal of one polarity and an outer terminal of opposite polarity, a casing adapted to be detachably secured to said battery in contact with said outer terminal, a lamp support mounted within said casing and provided with a portion extending through the side of said casing whereby said support may be actuated, a socket mounted on said support and a lamp mounted in said socket.

4. A battery hand lamp comprising, in combination, a battery having a central terminal of one polarity and an outer terminal of opposite polarity, a casing adapted to be detachably secured to said battery in contact with said outer terminal, a reflector secured within said casing and having an aperture at its inner end, a lamp support mounted within said casing and movable with respect thereto, a lamp mounted on said support and extending through the aperture in the reflector, and means for operating said support to move said lamp into and out of engagement with the central terminal of the battery.

5. In combination, a battery comprising a plurality of dry cells rigidly and electrically connected in series relation and having a central terminal of one polarity and an adjacent terminal of opposite polarity, a casing secured to said battery in contact with said adjacent terminal, a movable member mounted within said casing, a socket on said movable member, a lamp mounted in said socket, and means for moving said movable member with respect to said casing whereby said lamp may be moved into or out of engagement with said central terminal.

6. In combination, a battery comprising a plurality of dry cells rigidly and electrically connected in series and having a central terminal of one polarity and an adjacent terminal of opposite polarity, a casing detachably secured upon said adjacent terminal, a resilient support within said casing, a lamp socket attached to said support and a lamp secured in said socket and adapted to be moved into or out of engagement with said central terminal by motion of said resilient support.

7. A device of the character described comprising, in combination, a battery having an inner terminal of one polarity and an outer terminal of opposite polarity, a casing adapted to be detachably secured to said battery in contact with said outer terminal, a support within the casing having one end attached to said casing and the other end extending through an aperture in said casing, a socket upon the support and an electrical translating device mounted in said socket and having a terminal adapted to be brought into engagement with the inner battery terminal by movement of said support.

8. A device of the character described comprising, in combination, a battery having an inner terminal of one polarity and an outer terminal of opposite polarity, a casing adapted to be detachably secured to said battery in contact with said outer terminal, a support within said casing with one end attached to said casing and the other end extending through an aperture in said casing, a socket upon the support, an electric lamp mounted in said socket and having a terminal adapted to be brought into engagement with the inner battery terminal by movement of said support, and a reflector mounted within said casing and having an aperture at its inner end through which said lamp extends.

9. A battery hand lamp comprising, in combination, a battery, a casing associated with the battery, a reflector mounted within said casing, a lamp adjacent to said reflector, and a lamp support movable with respect to said reflector to move said lamp into and out of engagement with one terminal of said battery.

10. A battery hand lamp comprising, in combination, a battery, a lamp, a casing associated with the battery, and a lamp support in said casing and movable with respect thereto to move said lamp into and out of engagement with one terminal of said battery, substantially as described.

In testimony whereof I affix my signature.

CHARLES F. BURGESS.